United States Patent [19]

Clark et al.

[11] Patent Number: 4,712,070
[45] Date of Patent: Dec. 8, 1987

[54] APPARATUS FOR MICROINDUCTIVE INVESTIGATION OF EARTH FORMATIONS

[75] Inventors: Brian Clark, Ridgefield; Weng C. Chew, Danbury, both of Conn.

[73] Assignee: Schlumberger Technology Corporation, New York, N.Y.

[21] Appl. No.: 616,323

[22] Filed: May 31, 1984

[51] Int. Cl.[4] .............................................. G01V 3/12
[52] U.S. Cl. .................................... 324/338; 324/333; 343/742
[58] Field of Search ............... 324/326, 329, 338, 339, 324/340, 341, 343, 333; 343/719, 741, 742

[56] References Cited

U.S. PATENT DOCUMENTS

| | | | |
|---|---|---|---|
| 2,264,318 | 12/1941 | Lee | 324/339 |
| 2,582,314 | 1/1952 | Doll | 175/182 |
| 2,749,503 | 6/1956 | Doll | 324/1 |
| 2,785,396 | 3/1957 | Carter | 343/741 |
| 2,987,668 | 6/1961 | Goudouin | 324/6 |
| 3,060,373 | 10/1962 | Doll | 324/1 |
| 3,376,950 | 4/1968 | Grine | 181/5 |
| 3,388,323 | 6/1968 | Stripline | 324/8 |
| 3,526,874 | 9/1970 | Schwartz | 340/15.5 |
| 3,539,911 | 11/1970 | Youmans | 324/6 |
| 3,551,797 | 12/1970 | Gouilloud et al. | 324/6 |
| 3,564,914 | 2/1971 | Desai et al. | 73/152 |
| 3,808,520 | 4/1974 | Runge | 324/6 |
| 3,882,374 | 5/1975 | McDaniel | 324/329 |
| 3,944,910 | 3/1976 | Rau | 324/6 |
| 3,973,181 | 8/1976 | Calvert | 324/5 |
| 4,019,126 | 4/1977 | Meador | 324/5 |
| 4,251,773 | 2/1981 | Cailliau et al. | 324/347 |
| 4,255,711 | 3/1981 | Thompson | 324/329 |
| 4,302,723 | 11/1981 | Moran | 324/343 |
| 4,334,271 | 6/1982 | Clavier | 364/422 |
| 4,348,748 | 9/1982 | Clavier et al. | 367/25 |
| 4,355,357 | 10/1982 | Chan | 364/422 |
| 4,360,777 | 11/1982 | Segesman | 324/339 |
| 4,422,043 | 12/1983 | Meador | 324/338 |
| 4,453,219 | 6/1984 | Clavier et al. | 324/5 |
| 4,489,274 | 12/1984 | Berlincourt | 324/248 |
| 4,511,842 | 4/1985 | Moran et al. | 324/338 |

OTHER PUBLICATIONS

Fons, Lloyd, "New Dipmeter Tool Logs in Nonconductive Mud", The Oil and Gas Journal, Aug. 1, 1966, pp. 124–126.

Primary Examiner—Reinhard J. Eisenzopf
Assistant Examiner—Robert W. Mueller
Attorney, Agent, or Firm—Keith G. W. Smith; David H. Carroll; Peter Y. Lee

[57] ABSTRACT

A wall-engaging apparatus for microinductively investigating a characteristic of earth formation traversed by a borehole includes an antenna set mounted in a longitudinally elongated body adapted for a sliding engagement with the wall of the borehole. The antenna set includes a first antenna element, a second antenna element, and a third antenna element, the respective locations and orientations of the second and third antenna elements being selected to place the second and third antenna elements in electromagnetic symmetry relative to the first antenna element. Differentially coupling the second and third antenna elements. Either the first antenna element or the differentially-coupled second and third antenna elements may be energized by suitable means, while the other is coupled for receiving signals indicative of the characteristic.

21 Claims, 19 Drawing Figures

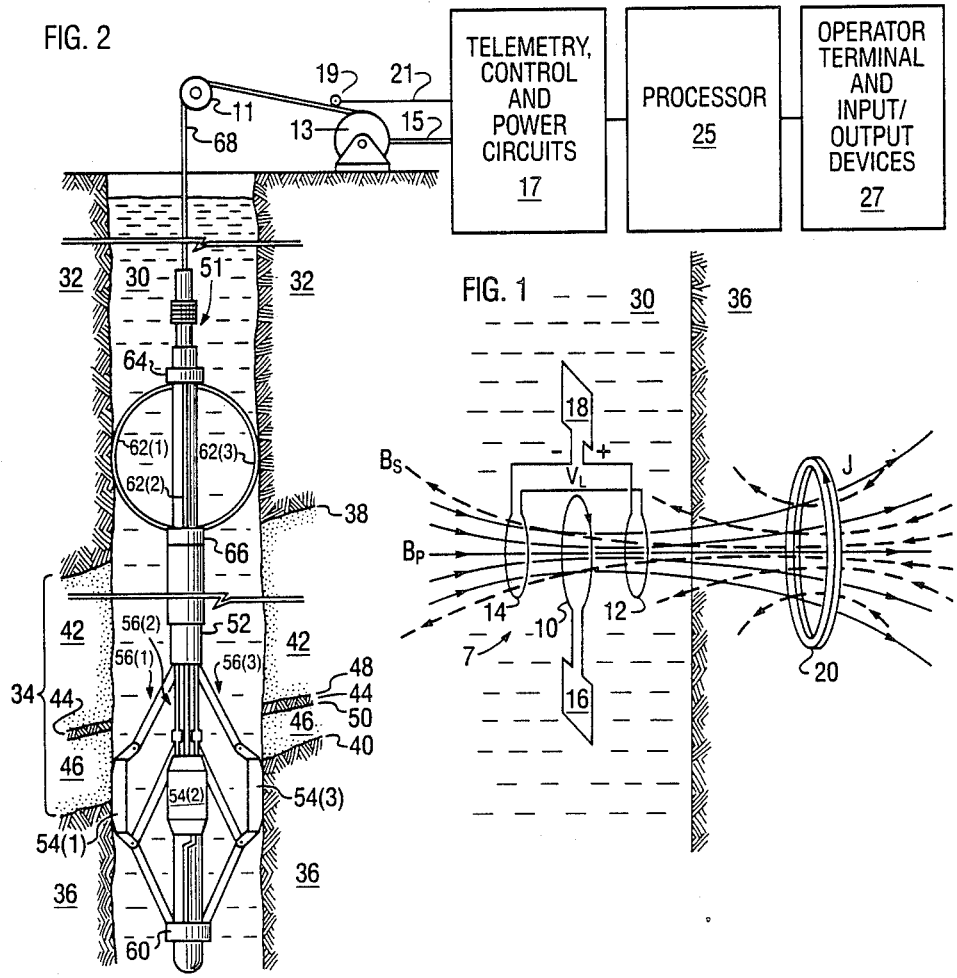

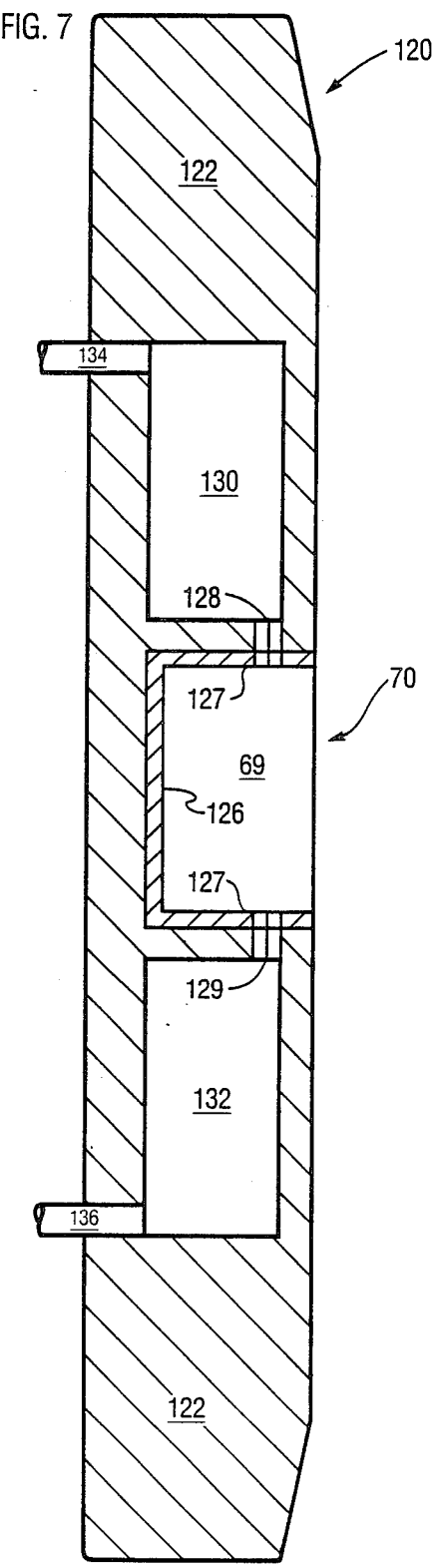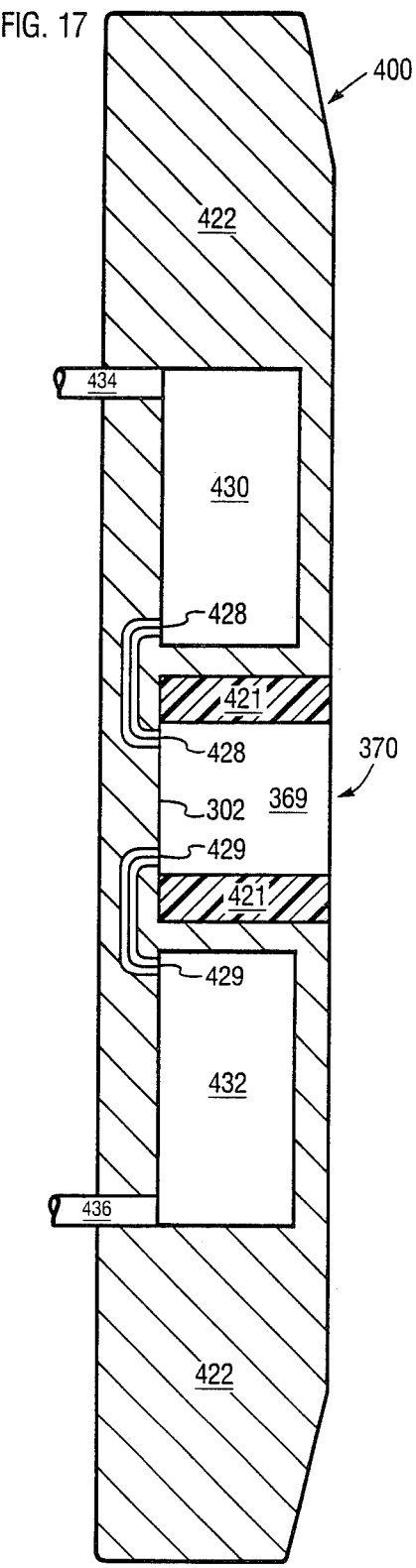

APPARATUS FOR MICROINDUCTIVE INVESTIGATION OF EARTH FORMATIONS

BACKGROUND

The present invention relates to methods and apparatus for high resolution measurement of one or more characteristics of earth formations traversed by a borehole, and more particularly to methods and apparatus for high resolution measurement of one or more characteristics of earth formations traversed by a borehole for determining the dip and azimuth of these formation beds.

One of the most valuable aids in the exploration for oil and gas is the dipmeter log, which provides positive structural and stratigraphic information for both exploration and development drilling programs. Advances in dipmeter tool design, magnetic taping, machine computerization, and interpretation methods make it possible to recognize such features as structural dip, faults, unconformities, bars, channels, and reefs. In addition, the direction of sedimentation and of pinchouts can be estimated. When combined with data from other wells, dipmeter information helps to establish the overall structural and stratigraphic picture of the area under study.

The focussed current type of dipmeter has been particularly well received by the wireline logging industry for use in logging boreholes drilled with conductive drilling fluids. Focussed current dipmeter tools employ at least three pads and commonly four, each of which comprises one or more electrodes for emitting a focussed current beam into the adjacent formation. The current flow at each electrode is proportional to the conductivity of the adjacent formation. Focussed current dipmeters are described in U.S. Pat. No. 3,060,373, issued Oct. 23, 1962 to Doll; U.S. Pat. No. 4,251,773, issued Feb. 17, 1981 to Cailliau et al.; and U.S. Pat. No. 4,334,271, issued June 8, 1982 to Clavier. These are able to achieve good vertical resolution at reasonable logging speeds, the micro-resistivity sensors used on some of these tools being capable of resolution to as fine as 0.2 inch.

The great amount of data acquired by dipmeters, and especially the high resolution focussed current dipmeters, is advantageously exploited by the use of computers. For example, suitable computer implemented correlation techniques are described in U.S. Pat. No. 4,348,748, issued Sept. 7, 1982 to Clavier et al., and U.S. Pat. No. 4,355,357, issued Oct. 19, 1982 to Chan. Improved dip determinations often can be obtained by use of other computer-implemented techniques, such as that described in U.S. Pat. No. 4,453,219, issued June 5, 1984 to Clavier et al.

Other types of dipmeters have been proposed for use in boreholes drilled with conductive drilling fluids, including the electrical-toroidal type described in U.S. Pat. No. 2,987,668, issued June 6, 1961 to Gondouin. None of them has achieved the popularity of the focussed current tools.

Unfortunately, electrical dipmeters, including the focussed current type, are not altogether satisfactory for use in boreholes which have been drilled with a nonconductive fluid such as air or an oil-based mud. Electrical dipmeters require a conductive medium to permit the flow of current from the electrode system into the formation. This conductive medium is not present in boreholes drilled with air or an oil based mud.

Various approaches employing pad-mounted electrodes have been taken to obtain dip information in wells drilled with nonconductive drilling fluids. One approach, which is exemplified by U.S. Pat. No. 2,749,503, issued June 5, 1956 to Doll, and more recently by U.S. Pat. No. 3,973,181, issued Aug. 3, 1976 to Calvert, uses high frequency electromagnetic energy to measure the capacitive coupling of an electrode to the formation. Another approach, described in an article by Fons entitled "New Dipmeter Tool Logs in Non-conductive Mud," The Oil and Gas Journal, Aug. 1, 1966, pp. 124-26, advocates the use of monoelectrode contact knife-like electrodes to make direct contact with the formation.

Other approaches to obtain dip information in wells drilled with nonconductive drilling fluids dispense with electrodes altogether. Acoustic techniques employing pad-mounted acoustic transducers are taught in, for example, U.S. Pat. No. 3,376,950, issued Apr. 9, 1968 to Grine; U.S. Pat. No. 3,526,874, issued Sept. 1, 1970 to Schwartz; and U.S. Pat. No. 3,564,914, issued Feb. 23, 1971 to Desai et al. An electromagnetic wave logging dipmeter is disclosed in U.S. Pat. No. 4,422,043, issued Dec. 20, 1983 to Meador.

In addition, techniques based on the principal of induction logging have been proposed for measuring dip by the use of either mandrel-mounted coils or pad-mounted coils. In conventional induction logging, such as disclosed in U.S. Pat. No. 2,582,314, issued Jan. 15, 1952 to Doll, oscillating magnetic fields formed by one or more energized induction coils induce currents in the formation around the boreholes. These currents in turn contribute to a voltage induced in one or more receiver coils through a secondary magnetic field. The voltage component of the received signal that is in phase with respect to the transmitter current, known as the R-signal, is approximately proportional to formation conductivity.

When operating a mandrel tool in a borehole traversing a homogeneous medium, ground current flow loops arise which coincide with the primary electric field induced by the primary magnetic field of the transmitter. Hence, the ground loops are coaxial relative to the receiving and transmitting coils and the borehole. Under certain conditions of the surrounding earth formations, however, such as dipping beds or fractures, the average plane of the ground current flow loops vary from this coincident alignment. The phenomena is exploited in the mandrel-type induction dipmeter. In one early mandrel induction dipmeter, a coil array is mechanically rotated to produce modulation components in the receiver signals at the frequency of rotation of the coil array. The modulation components are processed to obtain indications of the dip, dip azimuth and/or anisotropy. More recently, techniques have been proposed which utilize mechanically passive induction coil arrays to obtain measurements of formation dip, dip azimuth, and/or anisotropy. Systems of this type are taught in, for example, U.S. Pat. No. 3,808,520, issued Apr. 30, 1974 to Runge; U.S. Pat. No. 4,302,723, issued Nov. 24, 1981 to Moran; and U.S. Pat. No. 4,360,777, issued Nov. 23, 1982 to Segesman.

Other induction techniques use pad-mounted field generating and sensing transducers to measure such characteristics as conductivity, magnetic susceptibility, and dielectric constant, as well as the dip of earth formations. An early system is described in U.S. Pat. No. 3,388,323, issued June 11, 1968 to Stripling. The Stripling apparatus comprises three circumferentially spaced sensors which are urged against the borehole wall. A composite field comprising a primary magnetic field and a secondary magnetic field is created and sensed by each sensor. Phase separation is applied to the sensed signal to obtain measurements of magnetic susceptibility and electrical conductivity. The sensor of the Stripling apparatus comprises a coil wrapped around a core of high-permeability material to increase the flow of magnetic flux through the coil. The coils have a length of about three inches and a diameter of about one-half inch. The axes of the coils are tangential to a circle lying in a plane normal to the tool axis. Separate transmitting and receiving coils are contemplated as well. The apparatus operates at frequencies under 60 kHz.

A pad configuration intended to reduce sensitivity to borehole diameter and borehole fluid conductivity is disclosed in U.S. Pat. No. 3,539,911, issued Nov. 10, 1970 to Youmans. The pad comprises a pair of transmitter coils, said to be wound in series opposition, mounted within the pad at an acute angle from the longitudinal axis of the elongated sonde, and a receiver coil mounted substantially parallel to the longitudinal axis between the transmitter coils. The mounting angles of the transmitter coils are chosen to provide what is said to be a desired asymmetrical field of investigation. The apparatus operates at about 20 kHz, and both in-phase or out-of-phase detection techniques are contemplated. The axial distance between the axes of the transmitter and receiver coils are said to influence the investigative mode, and mutual balance of the coil configuration is said to be attained by adjusting that distance.

More recently, U.S. Pat. No. 4,019,126, issued Apr. 19, 1977 to Meador disclosed an apparatus intended to avoid the temperature and pressure sensitivity of the aforementioned Stripling apparatus. Meador teaches that the sensing coil of an induction dipmeter arm may be constructed without a high permeability core, which is quite temperature and pressure sensitive. The coil proposed by Meador comprises two turns of one-eighth inch diameter copper wire, each turn being approximately three-quarters of an inch by three-eighths of an inch. Meador also teaches that two separate coils may be employed in each pad, one coil being the transmitter and the other being the receiver. The coil is arranged with its longitudinal axis parallel to the axis of the sonde. The coil is coupled with a capacitor to form a tank circuit, which is connected to an oscillator circuit. The operating frequency is said to be in the range of preferably between 50 MHz and 200 MHz, with satisfactory operation at lower frequencies as well. The Meador apparatus is intended to measure resistivity and dielectric constant.

The pad-mounted induction dipmeter systems generally have been disappointing. Some of the techniques are sensitive to borehole diameter and fluid conductivity, or to borehole temperature and pressure. Moreover, some of the systems themselves are not highly sensitive to the very parameters they are intended to measure, which is particularly troublesome when effects resulting from temperature, pressure, alignment inaccuracies, and operation instabilities contribute to the detected signal.

SUMMARY OF THE INVENTION

An object of the present invention, therefore, is to provide a novel sensor suitable for microinductively determining one or more characteristics of an earth formation, such as conductivity, dielectric constant, and/or the dip and azimuth of earth formation bedding.

Another object of the present invention is to provide a microinduction sensor that is suitable for use in a borehole drilled with a nonconductive drilling fluid.

Yet another object of the present invention is to provide a microinduction sensor that performs well under various borehole pressure and temperature conditions.

These and other objects are achieved by a wall-engaging apparatus for microinductively investigating a characteristic of earth formations traversed by a borehole, in accordance with the present invention. The apparatus comprises an antenna set mounted in a longitudinally elongated body. The elongated body is adapted for a sliding engagement with the wall of the borehole. The antenna set includes a first antenna element, a second antenna element, and a third antenna element; the respective locations and orientations of the second and third antenna elements being selected to place the second and third antenna elements in electromagnetic symmetry relative to the first antenna element and, preferably parallel thereto. Means are included for differentially coupling the second and third antenna elements. Either the first antenna element or the differentially-coupled second and third antenna elements may be energized by suitable means within a frequency range of 1 MHz and 300 MHz to couple electromagnetic energy into a formation being investigated, while the other is coupled to means for receiving signals indicative of the characteristic. Several embodiments are described.

BRIEF DESCRIPTION OF THE DRAWINGS

In the drawings, where like reference characters indicate like parts:

FIG. 1 is an illustration useful in explaining theory of operation;

FIG. 2 is a plan view of a borehole logging tool;

FIG. 7 is a cross-sectional view of a logging pad;

FIG. 17 is a cross-sectional view of another logging pad; and

DETAILED DESCRIPTION OF THE PREFERRED EMBODIMENTS

Figure 3:
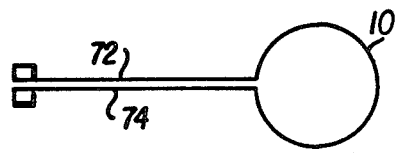
FIG. 3 is a plan view of a transmitter loop.

The present invention may be better understood in the context of the underlying principle of one of the embodiments, explained with reference to the simplified representation of FIG. 1. A sensor 7 includes a transmitter loop 10 and two receiver loops 12 and 14 nominally positioned symmetrically about and coaxial with the transmitter loop 10. The transmitter loop 10 is coupled to a source of oscillatory current 16. Receiver loops 12 and 14 are connected in series opposition to a receiver 18. The sensor 7 is positioned in the borehole 30 such that the planes of the transmitter loop 10 and receiver loops 12 and 14 are parallel to a plane tangential to the borehole wall at a location where formation 36 is to be investigated. The oscillating current flowing in the transmitter loop 10 creates a primary magnetic field $B_p$, exemplary field lines of which are shown in FIG. 1. A primary electric field (not shown) is induced by the primary magnetic field $B_p$. The primary electric field causes oscillating currents, termed eddy currents, to flow in nearby conductive material. Eddy currents flow in closed loops which in a homogeneous material are coaxial with the transmitter loop 10. An exemplary eddy current unit ground loop is represented at 20. Since these eddy currents do not cross the boundary between the borehole 30 and surrounding formation, the presence of an insulating mud or mudcake does not interrupt the individual current paths in the formation. The magnitude of these eddy currents is proportional to the current in the transmitter loop 10 and the conductivity of the formation, and create a relatively weak, secondary magnetic field $B_S$, exemplary field lines of which are illustrated in FIG. 1, that is detected by the receiver loops 12 and 14.

Normally, the detection of the secondary magnetic field $B_S$ is quite difficult due to the presence of the considerably stronger primary magnetic field $B_p$. To overcome this problem, the receiver loops 12 and 14 are placed symmetrically about and coaxial with the transmitter loop 10, and are wired in series opposition. In this arrangement, the flux of the primary magnetic field $B_p$ passing through the receiver loops 12 and 14 is identical; hence their responses to the primary magnetic field $B_p$ cancel. As is apparent from FIG. 1, the flux of the secondary magnetic field $B_S$ passing through the receiver loop 12 is stronger (i.e., lines of flux more closely spaced) than the flux passing through the receiver loop 14. Hence, a voltage $V_L$ arises from the current induced in the receiver loops 12 and 14 by the secondary magnetic field. The voltage $V_L$ is proportional to the conductivity of the formation.

A better appreciation of the theoretical basis of this embodiment may be had by describing the response of sensor 7 with the geometrical factor theory, a quasi-static approximation first used by Henri Georges Doll to describe induction logging tools. In accordance with a low frequency approximation, the electric field generated by an electric current loop of radius $\rho'$ located at $z'$ is, assuming $e^{-i\omega t}$ dependence $$E_\phi(\rho,z,\rho',z') = \frac{i\omega\mu I\rho'}{\pi k \sqrt{\rho\rho'}} \left[ \left(1 - \frac{k^2}{2}\right) F(k) - E(k) \right] \quad (1)$$

where $$k^2 = \frac{4\rho\rho'}{(\rho + \rho')^2 + (z - z')^2} \quad (2)$$

where $(\rho,z)$ is the observation point, and where $F(k)$ and $E(k)$ are elliptical integrals. A normalized electric field $\widetilde{E}_\phi$ is defined as $$E_\phi = i\omega\mu I\rho'\widetilde{E}_\phi \quad (3)$$

In the presence of a conductive medium, a current loop at $(a,0)$, such as that supported by the transmitter loop 10, induces an eddy current ground loop, such as indicated at 20, given by $$J_\phi(\rho',z') = i\omega\mu\sigma Ia\widetilde{E}_\phi(\rho',z';a,0) \quad (4)$$

This ground loop produces a secondary electric field given by $$\Delta E_{\phi s}(\rho,z) = i\omega\mu J_\phi(\rho',z')\Delta\rho'\Delta z'\rho'\widetilde{E}_\phi(\rho,z;\rho',z') \quad (5)$$
$$= -\omega^2\mu^2\sigma Ia\Delta\rho'\Delta z'\rho'\widetilde{E}_\phi(\rho,z;a,0)\widetilde{E}_\phi(\rho,z;\rho',z')$$

which in turn induces a voltage across the receivers 12 and 14, wired in series opposition. This voltage is $$\Delta V = -2\pi[b_1\Delta E_{\phi s}(b_1,h_1) - b_2\Delta E_{\phi s}(b_2,-h_2)] \quad (6)$$
$$= 2\pi\omega^2\mu^2\sigma Ia\rho'\Delta\rho'\Delta z' E_\phi(\rho',z';a,0)$$
$$[b_1\widetilde{E}_\phi(b_1,h_1;\rho',z') - b_2\widetilde{E}_\phi(b_2-h_2;\rho',z')]$$

In the above $(b_1,h_1)$ and $(b_2,-h_2)$ are the receiver locations. They are chosen so that the direct mutual coupling between the transmitter and the receivers is zero. In the absence of a ground plane, nominally $b_1 = b_2$ and $h_1 = h_2$.

The total voltage across the receiver loops 12 and 14 due to all ground loops in the formation is $$V = 2\pi\omega^2\mu^2 Ia \int_0^\infty d\rho' \int_{-\infty}^{-d_0} dz'\sigma(\rho',z')G(\rho',z') \quad (7)$$

where $G(\rho', z')$, which is a geometrical factor that denotes where the signal is coming from in the formation, may be expressed as $$G(\rho',z') = \rho'\widetilde{E}_\phi(\rho',z',a,0)[b_1\widetilde{E}_\phi(b_1,h_1,\rho',z') - b_2\widetilde{E}_\phi(b_2,-h_2;\rho',z')] \quad (8)$$

It has been found that the geometrical factor is peaked around $\rho \approx L_e$ where $L_e$ is a length that depends on the dimensions of the antenna array and the distance from the sensor. Since the geometrical factor is symmetric about $\rho = 0$, the part of the formation that contributes most to the signal has the shape of a truncated cone.

A normalized geometrical factor, which is a function of antenna standoff from the borehole wall, can be expressed as $$\int_0^\infty d\rho' \int_{-\infty}^{-d_0} dz'\widetilde{G}(\rho',z') = 1 \quad (9)$$

The apparent conductivity then is given by:

$$\sigma_A = \int_0^\infty d\rho' \int_{-\infty}^{-d_0} dz' \sigma(\rho',z') \widetilde{G}(\rho',z') \quad (10)$$

where $G(\rho', z')$ and $G(\rho', z')$ are related as:

$$G(\rho',z') = c\widetilde{G}(\rho',z') \quad (11)$$

and where $$c = \tfrac{1}{2} \int_0^\infty d\lambda \, \frac{J_1(\lambda a)}{\lambda^2} e^{-2\lambda d_1} [b_1 J_1(\lambda b_1) e^{\lambda h_1} - b_2 J_1(\lambda b_2) e^{-\lambda h_2}] \quad (12)$$

This relates the voltage at the receivers to the conductivity of the formation.

It is to be noted that the voltage across the receiver loops 12 and 14 due to the formation signal given by Equation (7) is proportional to $\omega^2 \mu^2$. The primary voltage at the receiver loops 12 and 14, which is the direct mutual coupling, is proportional, if not canceled, to the electric field given by Equation (1), i.e. is proportional to $i\omega\mu$. While the direct mutual coupling is cancelled by the symmetrical arrangement of sensor 7, the stability of the cancellation does depend on the ratio of the formation signal to the direct mutual coupling signal. The ratio of the formation signal to the primary signal is approximately $i\omega\mu\sigma L_e$ where $L_e$ is an effective length determined by antenna array parameters. Hence, the sensor preferably should be operated at a high frequency to improve stability. The resolution of the coil set is approximately $L_e$, while the depth of investigation is also of the order of $L_e$.

The geometrical factor theory is a quasistatic approximation and does not work very well unless $\omega\mu\sigma L_e^2$ is much less than 1. This is because the skin and propagation effects are ignored. For many frequencies of interest, however, the geometric factor theory is quite adequate.

The problem of a current loop radiating above a transversely isotropic stratified medium can be solved exactly incorporating all wave effects. The electric field due to a current loop located at $(\rho', z')$ is $$E_\phi(\rho,z,\rho',z') = \quad (13)$$

$$-\frac{\omega\mu I \rho'}{2} \int_0^\infty dk_\rho \frac{k_\rho}{k_z} J_1(k_\rho \rho) J_1(k_\rho \rho') [e^{ik_z|z-z'|} + R^{TE} e^{+ik_z z + ik_z|d_0+z'|}]$$

where $R^{TE}$ is the Fresnal reflection coefficient for a horizontally stratified medium, where the stratified medium starts at $z=d_o$. In the presence of a ground plane, the electric field can be modified as follows:

$$E_\phi(\rho,z,\rho',z') = \quad (14)$$

$$-\frac{\omega\mu I \rho'}{2} \int_0^\infty dk_\rho \frac{k_\rho}{k_z} J_1(k_\rho \rho) J_1(k_\rho \rho') [e_\phi^P + e_\phi^P]$$

where $$e_\phi^P = e^{ik_z|z-z'|} - e^{-ik_z(z-d_1)+ik_z|d_1-z|}$$
$$e_\phi^P = R^{TE}[e^{ik_z|d_0+z'|} - e^{-ik_z(d_0-d_1)+ik_z|d_1-z'|}]$$
$$[e^{ik_z(z+d_0)} - e^{-ik_z(z-d_1)+ik_z(d_1+d_0)}]/[1 + R^{TE} e^{2ik_z(d_1+d_0)}] \quad (15)$$

While many of the novel features of the present invention are generally useful in making borehole measurements, the present invention is particularly advantageous for use in investigating structural and stratigraphic dip, especially in boreholes drilled with nonconductive fluids. A "dipmeter" tool in accordance with the present invention is shown generally at 51 in FIG. 2, residing in a borehole 30. The borehole 30, possibly drilled using a nonconductive drilling fluid such as an oil-based mud, traverses typical earth formations represented by shale formations 32 and 36 and an intervening sand formation 34, which includes sand beds 42 and 46 streaked with shale layers such as 44. A typical structural boundary is represented by boundary 38 between earth formations 32 and 34 and boundary 40 between earth formations 34 and 36. A typical stratigraphic boundary is represented by boundary 48 and boundary 50. Moreover, sand formations 42 and 46 may comprise various strata of sand (not shown) having different characteristics, such as coarse and fine grains. Other stratigraphic feactures may be present as well. The tool 51 comprises an elongated central support member 52 adapted for movement through the borehole 30. The elongated member 52 supports four substantially identical pads 54(1), 54(2), 54(3), and 54(4) (hidden), which are urged against the wall of the borehole 30 by respective arm mechanisms 56(1), 56(2), 56(3) and 56(4) hidden in association with collar 60. Collar 60 is mounted on the elongated support member 52, and slides on the member 52 to allow for expansion and contraction of the arm mechanisms 56(1)–56(4). The tool 51 also includes a suitable centering guide assembly coupled to the upper end of the elongated support member 52. The centering guide assembly includes flexible spring arms 62(1), 62(2), 62(3) and 62(4) (hidden), which are connected to suitable collars 64 and 66. One of the collars 64 and 66 is secured to the support member 52. The other collar is mounted on the support member 52, and slides on the member 52 to allow for expansion and contraction of the spring arms 62(1)–62(4). The centering guide assembly comprising springs 62(1)–62(4) cooperates with pads 54(1)–54(4) and associated arm mechanisms 56(1)–56(4) to maintain the tool 51 centered in the borehole 30.

The tool 51 is connected at its upper end to an armored multiconductor cable 68 to surface apparatus. The surface apparatus includes a sheave 11 over which the multiconductor cable 68 passes to a suitable drum and winch mechanism 13, for raising and lowering tool 51 through borehole 30. Electrical connection between the cable 68 and telemetry, control and power circuits 17 is made through a suitable multielement slip ring and brush contact assembly (not shown) and cable 15. The depth of the tool is determined by the use of a suitable measuring wheel mechanism 19, which is also connected to the telemetry, control and power circuits 17 by cable 21. Other surface instrumentation includes a processor 25 connected to the telemetry, control and power circuits 17, and operator terminal and input/output devices 27 connected to the processor 25.

The pads may be as shown at 120 in FIG. 7, as shown at 400 in FIG. 17, or as otherwise described below. An understanding of these embodiments will be facilitated by the following description of a laboratory implementation of an antenna set for which the transmitter loop 10, the receiver loops 12 and 14, and individual shield elements were fabricated from photolithographic masks with printed circuit board technology. The printed circuit boards were constructed of one ounce copper cladded polyimide material. A thin deposit of gold was plated onto the copper to control oxidation. The board material was 1.5 mm thick and reasonably rigid.

Figure 4:
FIG. 4 is a plan view of a receiver loop.

The transmitter loop 10 is illustrated in FIG. 3. The flat copper loop measures 2.0 cm in diameter and is broken at the point where terminal leads 72 and 74 are provided. The receiver loop 12 is illustrated in FIG. 4. The flat copper loop measure 1.0 cm in diameter and is broken at the point where terminal leads 76 and 78 are provided. Receiver loop 14 is identical to receiver loop 12. The transmitter loop 10 and the receiver loops 12 and 14 were characterized between 10 MHz and 50 MHz. The transmitter loop 10 was found to have an inductance of 88 nH and a series resistance of 0.3 Ω. The receiver loops 12 and 14 were found to have an inductance of 63 nH and a series resistance of 0.6 Ω. The resonant frequencies of these devices were several hundred MHz. It will be appreciated that the size of the loops 10, 12 and 14 controls the magnitude of the output signal, the volume of rock formation investigated (spatial resolution), and the depth of investigation. Generally, these factors increase with increasing loop size.

The laboratory sensor was formed by assembling the individual printed circuit boards upon which the transmitter loop 10 and receiver loops 12 and 14 had been fabricated. Receiver loops 12 and 14 were arranged in "electromagnetic symmetry" about the transmitter loop 10. Generally, electromagnetic symmetry is defined as $M_{ac}=M_{bc}$, in which the relative location and orientation, and the antenna parameters, of antennae A, B and C are such that the mutual induction between antennae C and A is used to cancel the mutual induction between antennae C and B. Electromagnetic symmetry is achieved in the present embodiment, for example, by physically locating the receiver loops 12 and 14 coaxially with and symmetrically about the transmitter loop 10. A suitable transmitter-receiver loop spacing was found to be 0.69 cm, although closer spacing is possible if some loss of sensitivity can be tolerated.

Figure 5:
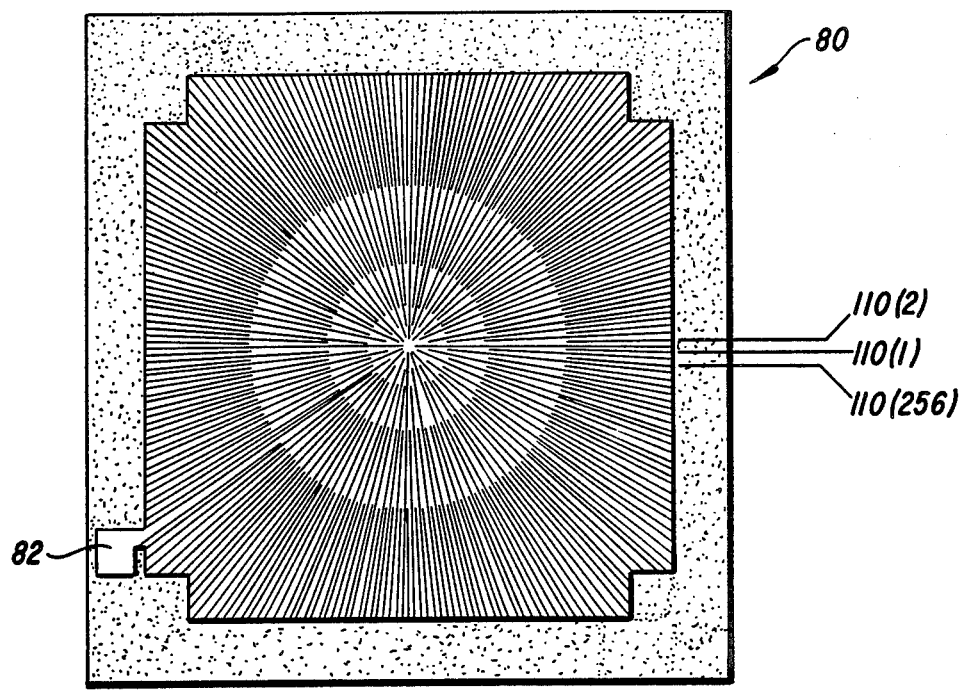
FIG. 5 is a plan view of an electroquasistatic shield.

Electroquasistatic coupling was found to be present between the various loop antennas and between the antenna set and the formation. This electroquasistatic coupling can be tolerated in many instances, although it may be eliminated where desired by the use of shield elements. A suitable shield element is shown at 80 in FIG. 5. The shield 80 comprises a number of conductive segments, for example 256 as indicated at 110(1), 110(2), ..., 110(256), radiating from a conductive center. The shield element 80 is radially slit to avoid the generation of azimuthal eddy currents therein by the azimuthal electric field induced by the magnetic fields. It will be noted that the etched lines of the shield image 80 extend to the edge of the metallic cladding. Moreover, the 256 etched lines are very closely spaced, insuring that disturbance of the magnetic field is minimized. Common electrical connection is provided only at this conductive center, which confers more complete shielding and a free path for radial currents. The shield 80 is square and measures 10 cm on a side. A shield terminal lead 82 is provided.

A reduction in the sensitivity of the laboratory sensor to resonant coupling of the transmitter loop 10 to the receiver loops 12 and 14, and of the antenna array to the formation was achieved by placing individual shield elements preferably between the transmitter loop 10 and each of the receiver loops 12 and 14, and between each of the receiver loops 12 and 14 and the external environment. Individual shield elements 80 were placed symmetrically about and coaxial with the transmitter loop 10 at a distance of 1.5 mm, the thickness of a printed circuit board. Individual shield elements 80 also were placed symmetrically about the outside of and coaxial with the receiver loops 12 and 14, also at a distance of 1.5 mm. The overall thickness of the fully assembled laboratory sensor, including shield elements and a protective outer layer of circuit board material, was 2.0 cm. Moreover, undesirable resonances, which would have increased the sensitivity of the sensor to variations in ambient conditions, were eliminated in the laboratory antenna set when shields such as 80 were included.

A more practical implementation of a sensor is shown generally at 70 in FIG. 7. The sensor 70, which provides an absolute measurement of formation conductivity, comprises an antenna set 69 which preferably has been metalized on the sidewall and back. The sensor 70 is set in a circular cavity centered in the metal body 122 of the exemplary pad 120 and fixed therein by a suitable adhesive. The rearward metalized portion 126 forms a highly conductive backplane, which functions to isolate the antenna set 69 from sonde and borehole effects as explained below. Moreover, the backplane 126 and conductive sidewall metalized portion 127 cooperate to improve the focussing of the various magnetic fields, as explained below. The metalization of the antenna set 69 may be omitted, in which instance the functions of the backplane 126 and sidewall 127 will be provided by the cavity itself. While such improvements in focussing and isolation are quite advantageous, they are not necessary in providing a functional sensor.

Figure 6:
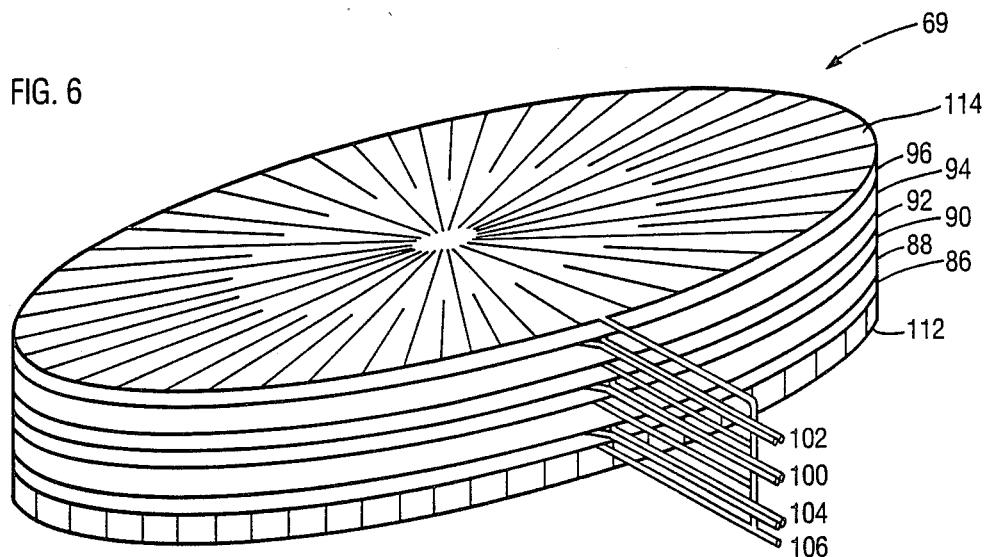
FIG. 6 is a perspective view of an assembled antenna set.

The antenna set 69 of FIG. 7, shown in more detail in FIG. 6, comprises the transmitter loop 10, the receiver loops 12 and 14, and if desired suitable electroquasistatic shield elements, arranged essentially as described above with respect to the laboratory implementation of the sensor but for a change necessitated by the use of the backplane 126. Other notable differences include the use of sidewalls about the antenna set 69 for improving the focussing of the composite magnetic field, the method of assembling the various elements of the sensor 70, and the implementation of one of the shield elements. Also, it may be desirable in some instances to use a thicker copper film in fabricating the transmitter loop 10 to avoid excessive joule heating. It will be understood that the dimensions given herein are illustrative only, and that other dimensions may be quite satisfactory as well.

The backplane 126 is a conductive sheet which isolates the antenna set 69 from the effect of conductive substances in the borehole 30 and exerts a predictable, hence correctable effect on the antenna set 69. Avoidance of conductive substances, even in a borehole drilled with a nonconductive drilling fluid, is unreliable in practice, particularly as the arm mechanisms 56 and the tool support member 52 are metallic. The backplane 126 acts much like a mirror with respect to radio frequency magnetic fields. The spatial resolution of an embodiment with backplane is unchanged and the depth of investigation decreased only very slightly from an embodiment without backplane. In theory, a current loop in the presence of a ground plane generates an electric field given by $$E_{\phi p}=-j\omega\mu Ip'[\bar{E}_\phi(\rho,z;\rho',z')-\bar{E}_\phi(\rho,z;\rho',-z'+2d_1)] \quad (16)$$

where $E_\phi$ is defined in Equation (3). The image theorem was invoked in the above. The analysis follows as before.

A suitable location for the backplane 126 has been found to be about 1.0 cm behind the receiver loop 14, although this distance is not critical and a lesser distance may be used if a thinner sensor is desired. To compensate for the difference in flux coupled into the receiver loops 12 and 14 by the image current attributable to the backplane 126, one of the receiver loops 12 and 14 must be displaced from exact physical symmetry to maintain electromagnetic symmetry. In the antenna set 69 of pad 120, the receiver loop 14 is moved about 0.08 mm closer to the transmitter loop 10.

The conductive cylindrical sidewall 127 about the antenna set 69 has two major effects, one quite advantageous and the other quite troublesome. On the one hand, the cylindrical sidewall 127 significantly enhances the resolution of the sensor 70, hence improving its thin bed response. On the other hand, the metal surface of the sidewall 127 and of the conductive face of the pad 120 cause an X-signal which is substantially larger than the R-signal of interest and larger than the X-signal encountered without conductive bodies in proximity to the antenna set 69. Because of the degree and stability of the electromagnetic symmetry which the present invention achieves, however, the very large X-signal cancels and the high resolution is realized.

The important parameter in resolution enhancement has been found to be the length of the aperture in the direction parallel to the motion of the pad 120. Improved resolution is achieved with shorter longitudinal aperture length.

The theory explaining the focussing is readily appreciated on an intuitive level. High frequency magnetic fields are excluded from the interior of metal due to skin effect. The metal backplane 127 and the metal sidewall 127, for instance, excludes the high frequency magnetic field from the metal body 122 and confines the field tightly within the cavity. Moreover, the high frequency magnetic field also tends to be constrained outside of the cavity, parallel to the sidewall of the cylindrical cavity, due to a boundary condition imposed on the magnetic field.

The elements of antenna set 69 are fabricated from suitable materials and assembled into a unitary package suitable for use in the borehole environment. While the general symmetry of the sensor 70 makes it largely self-compensating with respect to thermal expansion and pressure induced compression and hence scale invariant, better performance of the sensor 70 is achieved by ensuring essentially stable dimensions. Hence, components that strongly influence dimensional stability are made from materials having low thermal expansion coefficients and low compressibilities. The nonconductive materials preferably have a low dielectric loss as well. For example, in fabricating the transmitter loop 10, receiver loops 12 and 14, and the individual shield elements, a ceramic substrate material preferably is used. Moreover, the various ceramic substrates of the antenna set 69 may advantageously serve as spacing elements by proper selection of substrate thickness.

The assembled antenna set 69 having a wall-engaging face 112 and an opposing face 114 and comprising substrates 86, 88, 90, 92, 94, and 96 is shown in FIG. 6. Each of the substrates measure about 4.4 cm in diameter. The transmitter loop 10 lies approximately in the central plane of antenna set 69, between thin substrates 90 and 92, and is connected to lead 100. The 0.69 cm spacing between the transmitter loop 10 and receiver loop 12 is obtained with stacked substrates 90 and 88, which measure approximately 1.5 mm and 0.675 cm respectively. A shield element such as shown at 80 in FIG. 5, but measuring only about 4.4 cm in diameter and hence having only 128 segments, lies between the substrates 90 and 88, coaxial with transmitter loop 10. The approximately 0.68 cm spacing between the transmitter loop 10 and receiver loop 14 is obtained with stacked substrates 92 and 94, which measure approximately 1.5 mm and 0.665 cm respectively. A shield element such as shown at 80 in FIG. 5, but measuring only about 4.4 cm in diameter and hence having only 128 segments, lies between the substrates 92 and 94, coaxial with transmitter loop 10. Two additional shield elements such as shown at 80 in FIG. 5, but measuring only about 4.4 cm in diameter and hence having only 128 segments, are provided respectively between the receiver loops 12 and 14 and the external environment. These shield elements are coaxial with the receiver loops 12 and 14 spaced from the receiver loops 12 and 14 respectively by the thickness of substrates 86 and 96, each of which measures about 1.5 mm. It will be appreciated that these dimensions are illustrative.

A screw (not shown) capable of being moved along the axis of and into the antenna set 69 may be provided to fine tune the cancelation of the direct mutual coupling. In the event that a tuning screw is used, the conductive center of a shield element such as 80 through which the screw may pass must be enlarged to accommodate an orifice for the tuning screw. The resulting ring-like conductive center should be opened along a ray to prevent induction of eddy currents.

The shield element provided at the face 114 between receiver loop 14 and the environment external to it, which is the backplane 126 as shown in FIG. 7, is fabricated on substrate 96 as described above. The shield element provided at the face 112 between receiver loop 12 and the environment external to it, which is the formation being investigated, performs the additional function of protecting the antenna set 69 from the abrasive action of the wall of borehole 30. Hence, this shield element preferably is machined from a block of suitable conductive material such as brass or stainless steel.

A transmitter loop, receiver loop, or shield element of the antenna set 69 may be fabricated on either adjoining face of the substrates between which it lies. For example, transmitter loop 10 may be fabricated on the face of substrate 92 nearest face 112, or on the face of substrate 90 nearest face 114. The various substrates are bonded to one another along respective adjoining faces by means of a suitable bonding adhesive. Care must be taken in assembling the antenna set 69 to avoid imperfections in construction that might lead to residual direct mutual coupling between the transmitter loop 10 and receiver loops 12 and 14. The receiver loops 12 and 14 and the shield elements must be coaxial with respect to the transmitter loop 10. All elements thereof, including the ceramic substrates and unshielded leads, as well as any fasteners that might be used, must be symmetrically located insofar as possible, with the exception noted above.

In pad 120, respective conductors 128 and 129 connect the transmitter loop 10 and the receiver loops 12 and 14 to respective networks 130 and 132, the purposes for which are explained below. Network 130 is coupled to transmitter circuitry in the sonde body by cable 134, and network 132 is connected to receiver circuitry in the sonde body by cable 136. Cables 134 and 136 may be of a flexible coaxial type. Ferrite beads selected to have a large dissipation factor in the frequency range of interest are used on unshielded low-frequency leads and on the outer conductor of coaxial cables to reduce radio frequency currents on these structures.

Other pad arrangements are possible. For example, where the focussing and isolating functions performed by the metalization of the antenna set 69 or by the cavity in the pad body 122 are not desired, the pad body may comprise mostly dielectric material and a sensor such as sensor 7 may be mounted therein. Variations of the antenna set 69 are contemplated as well. For example, while reduction of the transmitter-receiver loop spacing generally reduces output signal levels, the transmitter-receiver loop spacing can be reduced by more than a factor of two without significant deterioration of performance. Moreover, a shield of reduced area also can be effective.

Figure 8:
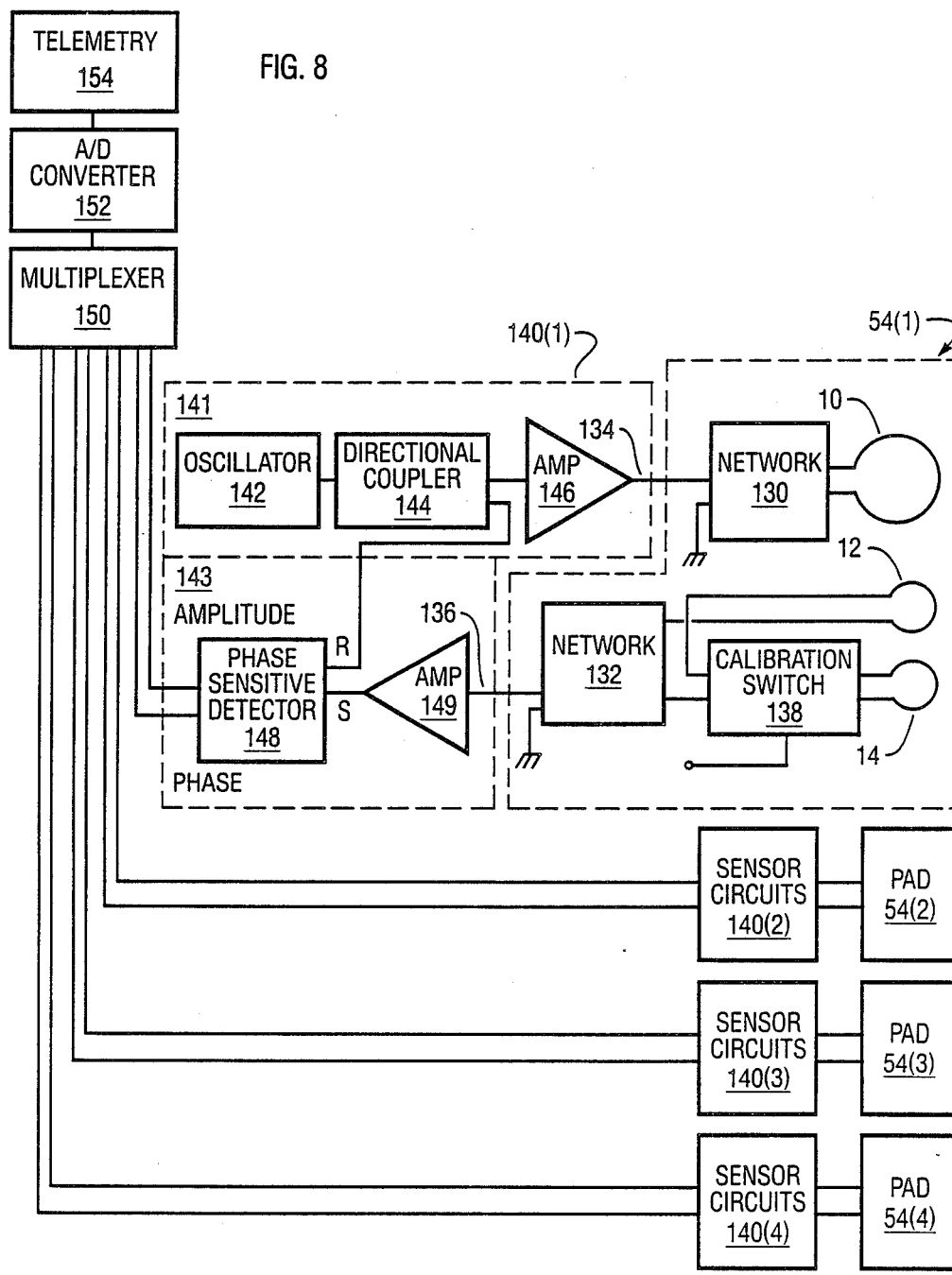
FIG. 8 is a schematic view of an electronic circuit.

An electrical circuit suitable for operating the sensor 70 is shown in FIG. 8. The pad 54(1) includes transmitter loop 10 and receiver loops 12 and 14, which are operated like a dual-secondary mutual inductance coil set. The transmitter loop 10 and receiver loops 12 and 14 are coupled to transmitter section 141 and receiver section 143 respectively through networks 130 and 132, which preferably are tuned to their respective loop antennas. The networks 130 and 132 are mounted on the pad 54(1) preferably in proximity to transmitter loop 10 and receiver loops 12 and 14 respectively, as variations in the electrical properties of wiring between a loop antenna and its respective network will adversely influence the tuning. Network 130 is constructed so that the transmitter loop 10 is driven in a balanced mode, to reduce the monopole component of the electric field. Network 130 minimizes reflections from the transmitter loop 10, which typically has a real impedance of less than an ohm. Receiver loops 12 and 14 are connected in series opposition through network 132, which is a subtractive network such as a balun, four port hybrid junction, or differential amplifier, that enables the direct mutual inductance to be nulled. A calibration switch 138 is connected across the leads from the receiving loop 14. The function of the calibration switch 138 is described below. p A sensor circuit 140(1), which comprises the transmitter section 141 and the receiver section 143, is located in the body of the tool 51. The transmitter section 141 comprises a continuous wave source oscillator 142 operating at a desired radio frequency. The output of oscillator 142 is supplied via directional coupler 144 to an amplifier 146, where the source energy is amplified and applied to transmitter loop 10 through the network 130. The source energy is split at the directional coupler 144, and supplied as a reference signal to the reference channel of a phase sensitive detector 148 in the receiver section 143. The phase sensitive detector 148 also is supplied at its signal channel with the signal from the receiver loops 12 and 14, applied through amplifier 149. Phase sensitive detector 148 provides at its output signals indicative of the power ratio and phase shift of the signal received at the receiver loops 12 and 14. Good isolation of the transmitter section 141 and the receiver section 143 is necessary since the sensor 70 has an insertion loss of −120 dB or more in the absence of a conductive formation.

Essentially identical sensor circuits 140(2), 140(3), and 140(4) are respectively connected to pads 54(2), 54(3), and 54(4). The power ratio and phase shift signals from the sensor circuits 140(1), 140(2), 140(3), and 140(4) are supplied to the input of a multiplexer 150, where they are sampled and supplied to and A/D converter 152. The output of the A/D converter 152 is supplied to the input of a telemetry system 154 for transmission to the surface equipment, which includes the processor 25.

The formation signal detected by, for example, the laboratory sensor comprised two components, one influenced principally by the conductivity of the formation and another influenced principally by the dielectric constant of the formation. The conductivity influenced component (R-signal) is preferred for use in the dip determination rather than the dielectric constant influenced component (X-signal) since contrasts in formation dielectric constant are generally smaller than contrasts in conductivity. The R-signal is coupled into the receivers in phase with the driving signal. All other signals, generally grouped as "nuisance" signals and including the X-signal, signals attributable to any unbalanced direct mutual inductance, and signals attributable to metals, are coupled into the receiver circuits 90° out of phase with the driving signal.

Phase sensitive detection may be advantageously used to reject all of the unwanted coherent signals, as well as incoherent noise. The phase sensitive detector 148 must be calibrated periodically, however, because cables, transformers, amplifiers and other such components contribute to phase shifts within the sensor circuit. Since the direct mutual inductance is 90° out of phase with the driving signal, a very large quadrature signal can be generated merely by shorting one of the receiver loops 12 and 14. A calibration switch 138 (FIG. 8) is provided for this purpose. The angle so measured then is subtracted from 90°, and the resultant calibration angle is stored by processor 25 so that formation phase measurements may be adjusted for these miscellaneous phase shifts. To determine a parameter that is proportional to conductivity, the measured amplitude is multiplied by the cosine of the adjusted phase measurement in processor 25. All nuisance effects are rejected in the sine component.

The operation of the present invention will be understood by considering experimental results achieved with the experimental sensor described above. A laboratory formation was constructed comprising alternating layers of saline water and a synthetic, granular, porous material saturated with the saline water. The synthetic material was Kellundite (Trademark) FAO-100 manufactured by Ferro Corporation of Rochester, N.Y. The material resembles clean sandstone when viewed under a scanning electron microscope. It has a porosity of about 40 percent, a formation factor of 5.5, and a permeability of several Darcies. The sample was saturated with water having a resistivity of 1 Ω-m, approximately the resistivity of shale. The circuit used in the laboratory experiments was similar to sensor circuit 140(1) and networks 130 and 132. The oscillator and phase-sensitive detector were elements of a Hewlett-Packard model 8505A network analyzer. A broadband amplifier with a gain of 33 dB fed the signal channel of the network analyzer, while a 40 dB attenuated source signal fed the reference channel. The network analyzer was under the control of a Hewlett-Packard model 9845B computer, which also governed the motions of the experimental mechanism.

The response of the laboratory sensor is readily appreciated on an intuitive level through a simple and approximate model known as "average loop response.38 The "average loop" is taken as the single ground loop that best approximates the average of the geometrical factor taken over all ground loop radii.

Figure 9:
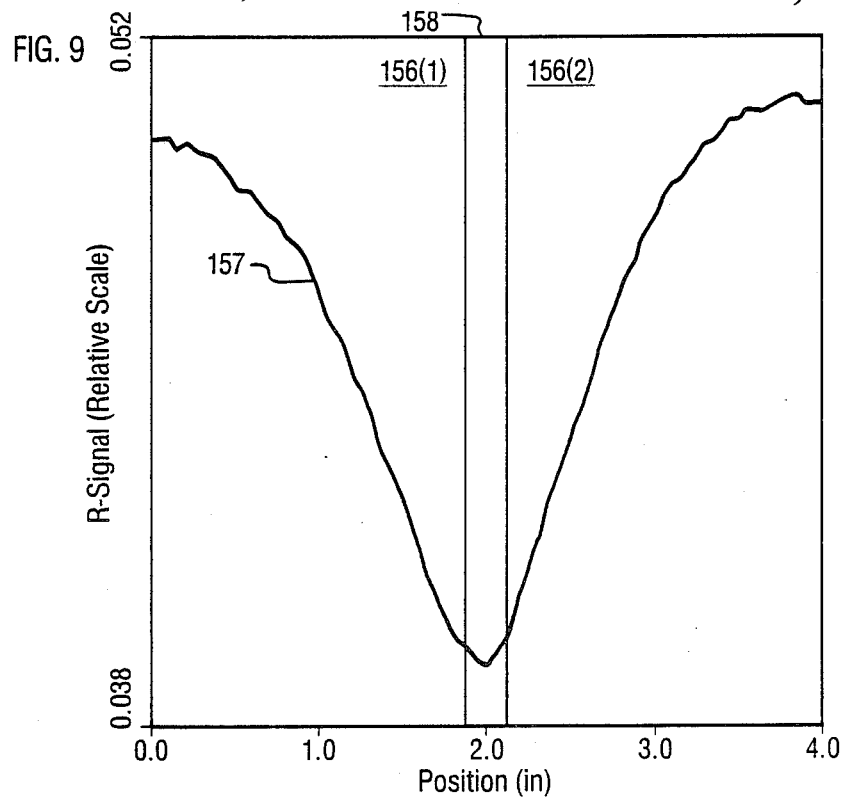
FIGS. 9, 10, 11 and 12 are graphs useful in explaining device response.
Figure 10:
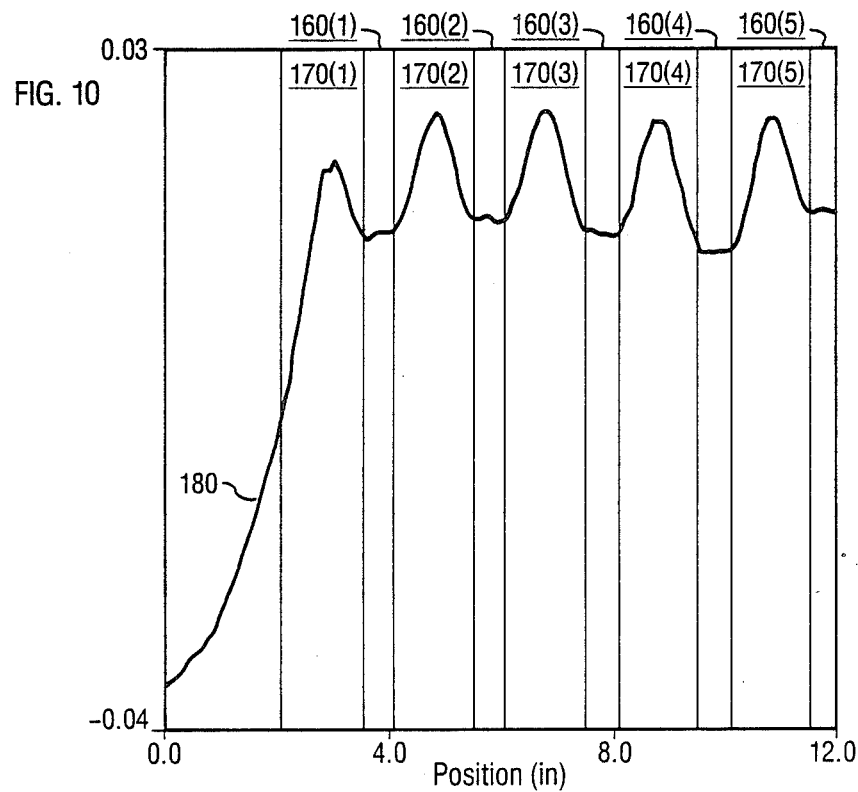

The response of the laboratory sensor to thin beds such as the shale streak 44 in FIG. 2 was found to depend on whether the thin bed was more resistive than the shoulders or more conductive. A thin resistive bed was found to reduce eddy currents in the surrounding conductive formation and to lead to a simple negative-going peak in the response, centered on the location of the resistive streak. This response, a "normal" response, is illustrated in FIG. 9. A thin resistive bed 158 comprising an insulating sheet 0.64 cm thick lay between relatively conductive beds 156(1) and 156(2). The resistive bed 158 was readily detected, as indicated by the sharp negative-going peak of trace 157. The normal response pattern is illustrated for a layered sequence in FIG. 10. The layered sequence comprised resistive beds 160(1), 160(2), 160(3), 160(4), and 160(5) and conductive beds 170(1), 170(2), 170(3), 170(4), and 170(5) in an alternating sequence. Each resistive bed 160 was 1.26 cm thick with resistivity 5.5 Ω-m. Each conductive bed 170 was 3.81 cm thick with resistivity 1.0 Ω-m, the thickness of the conductive beds 170 being as large as or larger than the diameter of the average loop. The response of the laboratory sensor, which is shown as trace 180, to the conductive beds 170 was a sequence of single positive-going peaks, while the response of the laboratory sensor to the thin resistive beds 160 was a sequence of single negative-going peaks.

Figure 11:
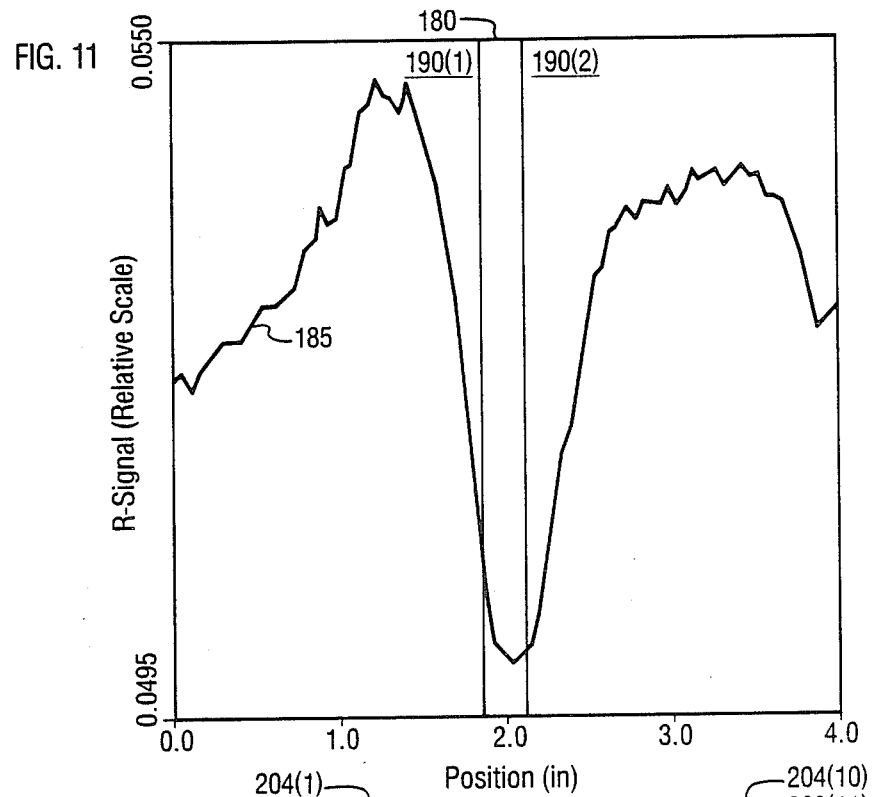

The response of the laboratory sensor to a conductive streak is somewhat complex. Following from the average loop concept, the response of the laboratory sensor is roughly proportional to the arc length of the average loop that falls within the thin conductive bed as the average loop passes over. The length of the arc is a maximum when the edge of the average loop intersects the thin bed, and is a local minimum when the sensor is centered on the thin bed. Essentially, the thin bed is being picked up by the "horns" of the geometrical factor. This "inverted" response is illustrated in FIG. 11, which shows a 0.64 cm thick 1 Ω-m layer imbedded in a uniform 5.5 Ω-m formation 190. The signal level as represented by curve 185 increased as the laboratory sensor approached the thin conductive bed 180, dropped sharply as the laboratory sensor moved directly over the thin conductive bed 180, increased as the laboratory sensor moved away from the thin conductive bed 180, and finally fell off as the laboratory sensor moved completely away from the thin conductive bed 180. The asymmetry and noise on the curve 185 are due to limitations in the laboratory model and equipment.

Figure 12:
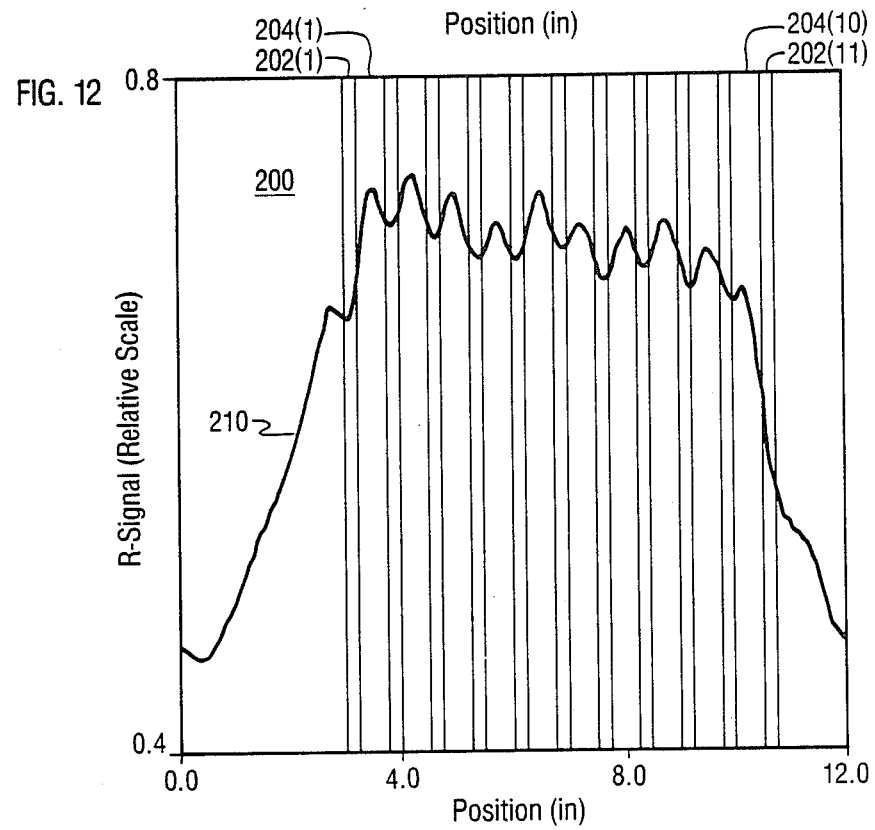

The central dip found when scanning a single thin conductive bed such as bed 180 in FIG. 11 is manifested for a formation containing many such beds as an inversion of the signal. This is illustrated in FIG. 12, which shows a 10 cm thick resistive bed 200 followed by alternating thin conductive beds 202 and comparatively thick resistive beds 204. The thin conductive beds 202 were 0.63 cm thick with 1 Ω-m resistivity. The comparatively thick resistive beds 204 were 1.27 cm thick with 5.5 Ω-m resistivity. Coming off of the thick resistive bed 200, the trend in the response curve 210 is positive, as would be expected. In the finely laminated region comprising alternating beds 202 and 204, the larger signal is associated with the resistive regions 204. This is the "inverted" response. The response of the laboratory sensor shown by curve 210 in FIG. 12 is to be contrasted with the "normal" response 180 shown in FIG. 10. Conductive beds smaller than about 2.5 cm result in inverted behavior, while larger beds do not.

Although the thickness of the conductive beds under investigation does influence whether a response will be normal or inverted, the effect does not interfere with the calculation of dip. An essential characteristic of a dipmeter is that it produces signals that are correlatable among the several pads. This condition is satisfied in the normal and inverted response patterns. Any suitable correlation technique, several of which were referenced above, may be advantageously used to determine dip.

Sensor 70 may be operated over a wide range of frequencies. The lower frequency limit at which sufficient signal strength is realized is about 1 MHz, although other dimensions and parameters can be selected to reduce this lower limit. Regardless, high frequency operation is preferred, since the formation signal voltage is proportional to the square of the frequency. Several factors limit the upper frequency extent, however. A fundamental limit is set by the skin effect, which confines electromagnetic signals to within a finite skin depth of the surface of a conductive body. The skin depth $\delta$ is given by $$\delta = \left( \frac{1}{\pi \mu f \sigma} \right)^{\frac{1}{2}} \tag{17}$$

If $\delta$ is measured in meters, then $\mu$ is the permeability in H/$\mu$, f is the frequency in Hz, and $\sigma$ is the conductivity in mho/m. As long as the skin depth is larger than the spatial extent of the field produced by the transmitter loop 10 and sensed by the receiver loops 12 and 14, resolution and depth of investigation of the sensor accuracy will be independent of formation conductivity. Such independance is desirable. Another limitation is the self-resonance of the antennas and cabling. The antenna loops used in the laboratory sensor have self-resonance frequencies in the range of several hundred megahertz, although the attachment of relatively short cables reduces these frequencies to around 90 MHz. At or above such a frequency, the sensor is insensitive to formation properties. With adequate attention paid to cabling issues, it is reasonable to use frequencies of 100 MHz or more.

Some laboratory experiments were conducted at 12 MHz, 25 MHz, and 55 MHz to investigate sensor performance at different frequencies. As expected, the signal-to-noise ratio increased dramatically at the higher frequencies. At 55 MHz, the skin depth in a 1 Ω-m formation was 6.8 cm, which is larger than the distance at which formation signals are sensed.

Sensor 70 should be capable of being operated at a power level in excess of 20 watts if ceramic technology appropriate to borehole applications is used. It was found that 20 watts of power could be delivered to the laboratory sensor. The sensitivity of the laboratory sensor at low power levels was investigated. The receiver bandwidth was set at 10 kHz. The formation was composed of alternating 1.27 cm layers of 5.5 Ω-m resistivity and 0.63 cm layers of 1.0 Ω-m resistivity. The 100 mW results were essentially found to be free of noise, the 10 mW results evidenced a small amount of noise, and the 1 mW results evidenced substantial noise, although not enough to entirely obscure the layering of the formation.

Receiver bandwidth and borehole logging speed were found to be interrelated. Receiver bandwidth has a direct effect on signal-to-noise level, as thermal noise power is directly proportional to it. The laboratory instrumentation had selectable IF stage filter bandwidths of 10 kHz and 1 kHz. A video (power averaging) filter was also available with a bandwidth of 30 Hz. Bandwidth limitation is beneficial in increasing the signal-to-noise ratio. Nonetheless, the measurement must be sufficiently broadband to permit a reasonable logging speed. Consider the case in which it is desirable to log at 1800 ft/hr and collect data every 0.2 inches. Then the receiver is being sampled 30 times per second. Hence, the receiver bandwidth can be no less than about 30 Hz. Trade-offs among dynamic range, power consumption, logging speed, and signal to noise ratio need to be considered in designing and operating the sensors of the present invention.

Figure 13:
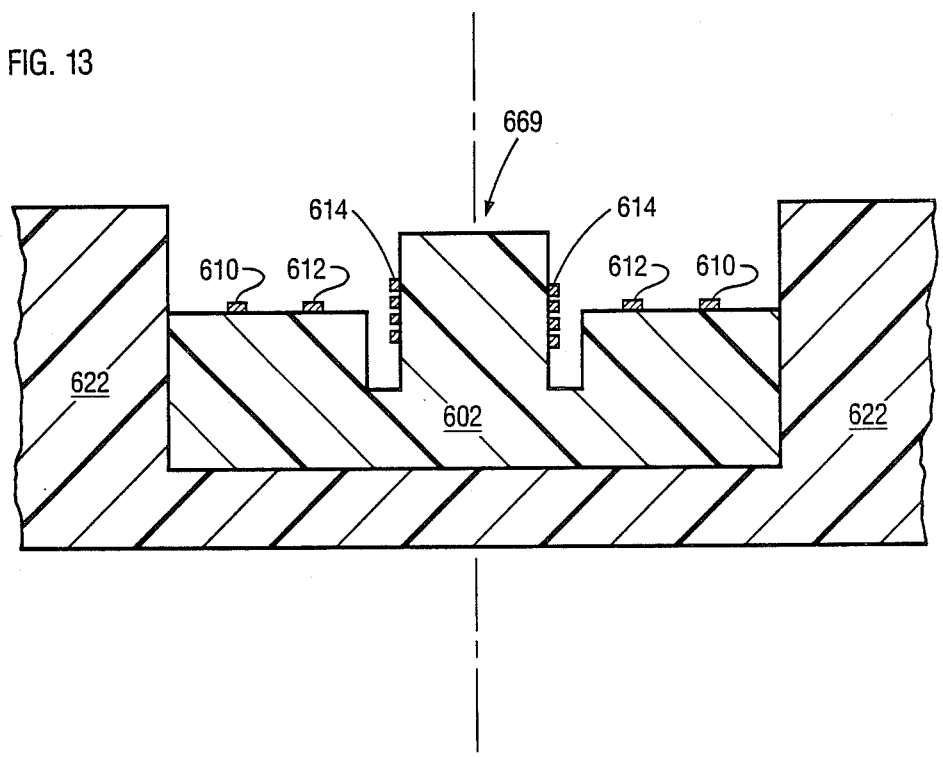
FIG. 13 is a cross-sectional view of another antenna set.

An embodiment of electromagnetically symmetrical sensor for absolute formation measurements which does not depend on physical symmetry is illustrated in FIG. 13. The sensor includes an antenna set 669 comprising form 602 and antennae 610, 612 and 614, mounted in a cylindrical cavity provided in a nonconductive pad body 622. The axis of the antenna set 669 in FIG. 13 is normal to the face of the pad body 622, although the antenna set 669 may be mounted with its axis parallel to the face of pad body 622 to achieve an absolute measurement as well. Mounting in a metal pad is possible, and would result in enhanced focussing and improved reliability because of the influence of a conductive sidewall and backwall, substantially as previously discussed.

The ceramic form 602 functions as a substrate for the transmitter loop antenna 610, the receiver loop antenna 612, and the receiver loop solenoid 614, which are fabricated on the form 602 using known photolithography technology. The respective central planes of the antennae 610, 612 and 614 preferably are common, although they may be offset at the expense of increasing the thickness of the antenna set. The cavity in which antenna set 669 is mounted is suitably sealed (not shown) from the external environment at the face of the pad body 622. Suitable illustrative values for the parameters of antenna set 669 are a=1 cm., b=2 cm., c=3 cm., and $N_a/N_b$=4.732.

The principle of operation essentially is as follows: If an antenna A (the inner solenoid 614) is considered to have "$N_a$" turns of radius "a;" and antenna B (the middle antenna 612) is considered to have "$N_b$" turns (where $N_b$=1) of radius "b;" and an antenna C (the outer antenna 610) is considered to have "$N_c$" turns (where $N_c$=1) of radius "c;" then the voltages $V_a^0$ and $V_b^0$ respectively in receivers A and B from the mutual inductances $M_{ac}$ and $M_{bc}$ is $$V_a^0 = j\omega M_{ac} I_c \quad (18)$$

$$V_b^0 = j\omega M_{bc} I_c \quad (19)$$

The radii and turn ratio $N_a/N_b$ is selected to force $M_{ac}=M_{bc}$ so that:

$$V_0 = V_a^0 - V_b^0 = +j\omega(M_{ac}-M_{bc})I_c = 0 \quad (20)$$

With the direct mutual cancelled, the formation signal is readily available. Consider an elemental ring in the formation of radius r, at a distance z from a pad, with cross-sectional area $\Delta r \Delta z$. The voltage induced in this ring is:

$$\Delta V_f = j\omega M_{fc} I_c \quad (21)$$

where $M_{fc}$ is the mutual inductance between the ring and antenna C. The eddy current in the ring is:

$$\Delta I_f = \Delta V_f \left( \frac{\Delta z \Delta r}{2\pi r} \sigma_f \right) \quad (22)$$

This induces a voltage in antenna A, given by:

$$\Delta V_a = j\omega M_{af} \Delta I_f \quad (23)$$

$$\Delta V_a = -\omega^2 I_c \sigma_f M_{af} M_{fc} \frac{\Delta z \Delta r}{2\pi r}, \quad (24)$$

where $M_{af}$ is the mutual inductance between antenna A and the ring. In like manner, the signal in antenna B is:

$$\Delta V_b = -\omega^2 I_c \sigma_f M_{bf} M_{fc} \frac{\Delta z \Delta r}{2\pi r}. \quad (25)$$

The total signal in the pair of receivers is given by the difference voltage, integrated over the formation:

$$V = -\frac{\omega^2 I_c}{(2\pi)^2} \int_h^\infty dz \int_0^\infty 2\pi r dr \sigma_f \left( \frac{(M_{af} - M_{bf})}{r^2} \right). \quad (26)$$

The term in the brackets is the "geometrical factor", which multiplies the formation conductivity.

The antenna set 669 may be operated with the circuit of FIG. 8, for example. Phase sensitive detection is used to improve the signal-to-noise ratio. Since the measurement preferably is a shallow, high resolution measurement, high frequency operation may be used to further improve the signal-to-noise ratio, since the formation signal is proportional to $\omega^2$, while the direct mutual signal is proportional to $\omega$.

Other antenna in the antenna set 669 may be selected for operation as transmitter. For example, antenna 614 is to be selected where a deeper investigation is desired, although the vertical resolution would be made correspondingly greater. Suitable illustrative values for the parameters of such a sensor are a=1 cm., b=2 cm., c=3 cm., and $N_c/N_b$=1.596.

Figure 14:
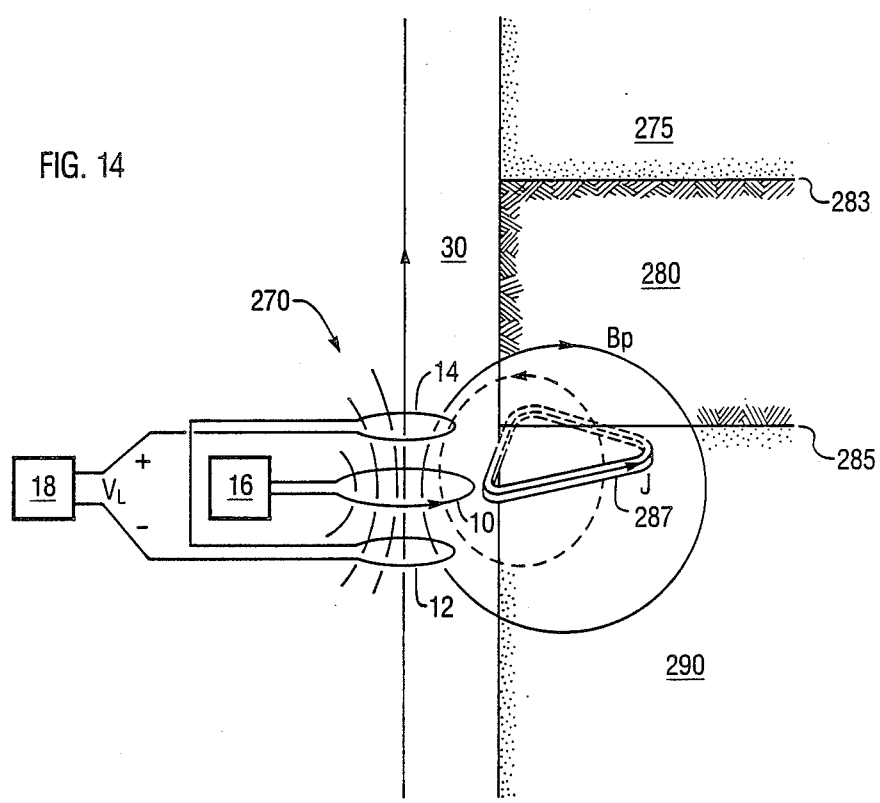
FIG. 14 is an illustration useful in explaining theory of operation.

When oriented as shown in FIGS. 1 and 7, sensors such as 7 and 70 provide an absolute measurement of formation conductivity. It has been found that an orientation of the transmitter loop 10 and receiver loops 12 and 14 set at 90° from that maintained in sensor 7 provides a differential measurement. A sensor 270 of this type, in which transmitter loop 10 and receiver loops 12 and 14 are rotated 90° in the radial plane of the borehole and hence "edgewise" to the wall of the borehole 30, is illustrated in FIG. 14. While the sensor 270 operates on the same basic principle as the sensor 7, the interaction with the formations under investigation differs. FIG. 14 shows a formation 280 such as, for example, a shale bed, lying between formations 275 and 290 such as, for example, sand beds which meet one another along boundaries 283 and 285 respectively. The transmitter loop 10 establishes a primary magnetic field, represented in FIG. 14 by exemplary field lines $B_p$. The primary magnetic field $B_p$ establishes an electric field which intersects the wall of the borehole 30, causing a charge accumulation to occur thereon. The resulting average unit ground loop 287 in turn induces a secondary magnetic field $B_S$, the field lines of which are intersected by the receiver loops 12 and 14.

Figure 15:
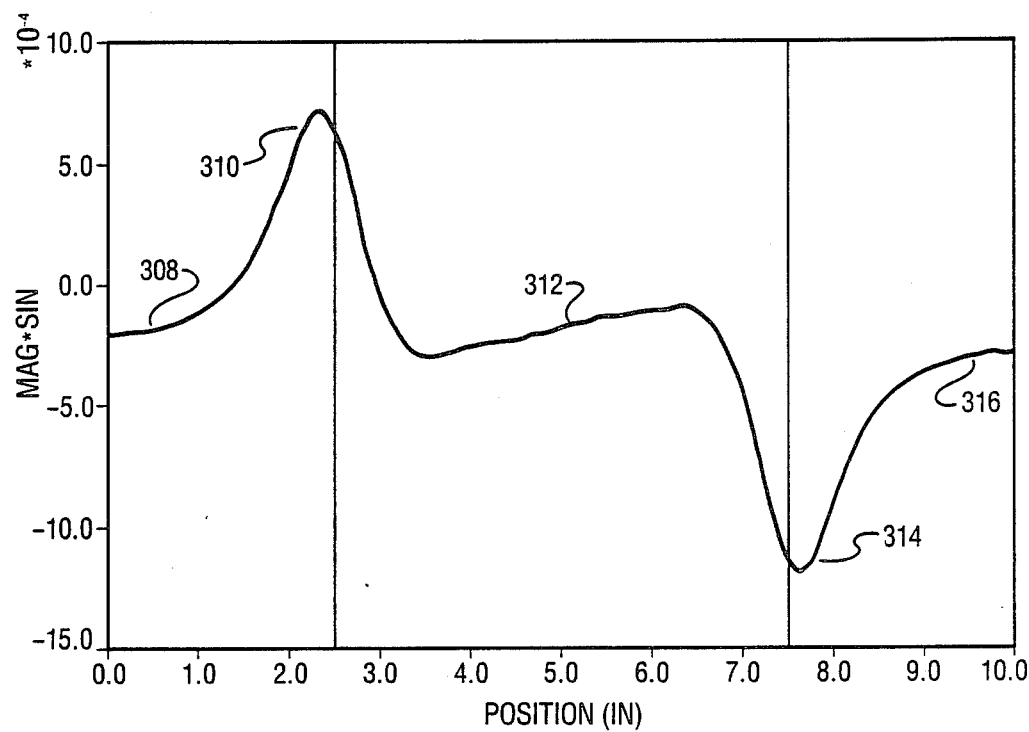
FIG. 15 is a graph useful in explaining device response.

FIG. 15 may be referred to for a qualitative understanding of the response of sensor 270 as it is drawn up borehole 30. The response of the sensor 270 to the homogeneous isotropic formation 290 is essentially flat (see curve section 308) until the sensor 270 draws near to the border 285 between formation 290 and formation 280. As the sensor 270 draws near to the formation 280, which is relatively impermeable to the nonconductive mud filtrate and hence is more conductive than formations 275 and 290, the formation eddy currents shift preferentially toward the more conductive layer 280. In other words, the average unit ground loop 14 shifts nearer to the plane of the receiver loop 14 than to the plane of the receiver loop 12. Hence, receiver loop 14 intersects more lines of the flux of the secondary magnetic field $B_S$ than does receiver loop 12, resulting in the positive response peak (see curve section 310). The differential measurement decreases as the transmitter loop 10 moves into the conductive formation 280 until the differential measurement once again is flat (see curve section 312). This sequence of events is reversed as the transmitter loop 10 moves toward the boundary 283 between formation 280 and formation 275. The differential measurement drops to a negative peak (see curve section 314) as the transmitter loop 10 moves across the boundary 283. As the transmitter loop 10 moves well away from the boundary 283, the differential measurement rises and then flattens out (see curve section 316).

FIG. 15 was produced in a laboratory experiment. The conductive layer 280 was simulated by a salt water bath, while relatively nonconductive formations 275 and 290 were simulated by air.

Figure 16:
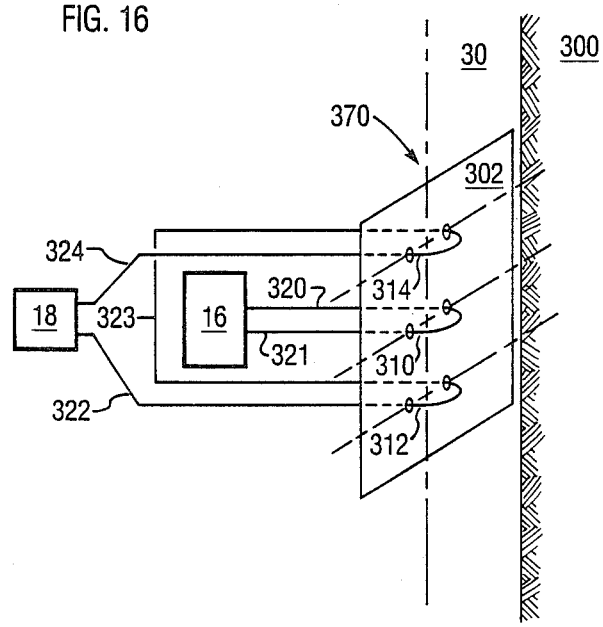
FIG. 16 is a simplified perspective view of a sensor with backplane element.

While a sensor such as 270 or antenna set 669 oriented with its axis parallel to formations traversed by the borehole are suitable for use in a borehole tool such as 51 having pads such as 54, the thickness of each pad 54 must be sufficient to accommodate the diameter of the transmitting loop 10, receiver loops 12 and 14, and any shield elements such as might be desired. A preferred arrangement which makes possible a pad 54 having a small thickness and providing better isolation for an antenna set is shown in FIG. 16, applied to an arrangement similar to sensor 270. The sensor 370 is shown disposed in borehole 30 adjacent formation 300. This sensor 370 comprises a backplane 302 and a transmitter half-loop 310. Two receiver half-loops 312 and 314 are located symmetrically about the transmitter half-loop 310, coaxial therewith. The transmitter half-loop 310 is connected to a source of oscillatory current 16 by leads 320 and 321, which pass through backplane 302. The receiver half-loops 312 and 314 are connected in series oppposition by lead 323, and to a receiver 18 by leads 322 and 324. Image currents arising in backplane 302 result in sensor 370 performing essentially identically with sensor 270 of FIG. 14.

An exemplary pad 400 which includes the sensor 370 is shown in FIG. 17. An antenna set 369, which includes transmitter half-loop 310 and receiver half-loops 312 and 314 fabricated, for example, with the ceramic technologies described above, is shown residing within a rectangular cavity formed in the metal body 422 of the pad 400 and secured with a suitable abrasive-resistant dielectric material 421. The antenna set 369 preferably is centered in the cavity. The distance between the antenna set 369 and the cavity walls is selected on the basis of the degree of focussing desired. The antenna set 369 is backed by a backplane section 302 of the metal body 422. Wires 428 and 429 connect the transmitter half-loop 310 and the receiver half-loops 312 and 314 to respective networks 430 and 432. The network 430 is coupled to the transmitter circuitry in the sonde body by cable 434, and the network 432 is connected to receiver circuitry in the sonde body by cable 436. Cables 434 and 436 may be of the flexible coaxial type. Ferrite beads selected to have a large dissipation factor in the frequency range of interest should be used on unshielded low-frequency leads and on the outer conductor of the coaxial cables to reduce radio frequency currents on the structures.

Suitable electrical circuits for the sensor 370 have been described above. The operation of sensor 370 also has been described above with respect to FIG. 14. Since the output of the sensor 370 is correlatable with the output of other similar sensors, any one of several conventional dip determining techniques may be applied for determining dip.

Figure 19:
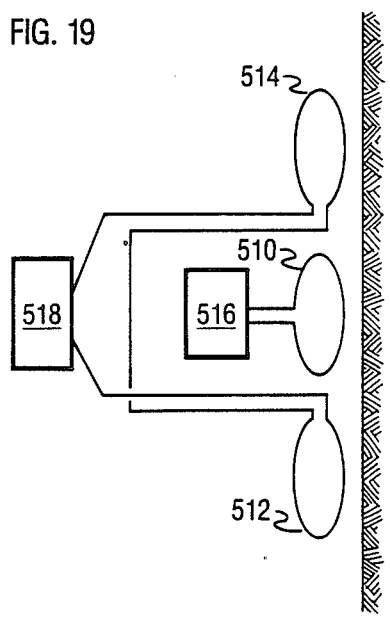
FIGS. 18 and 19 are illustrations useful in explaining theory of operation.
Figure 18:
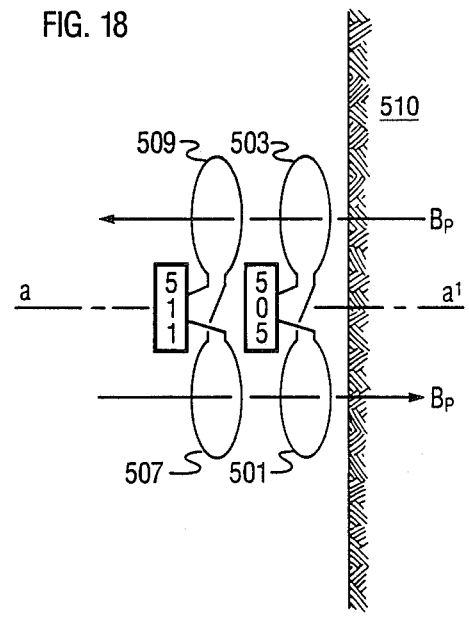

While the present invention has been described with reference to several particular embodiments, it is to be appreciated that the embodiments are illustrative only in that the invention is not intended to be limited to only the disclosed embodiments. Variations and combinations within the spirit and scope of the invention will occur to those skilled in the art. One such variation, which is suitable for making a differential measurement, is illustrated in FIGS. 18 and 19. The coplanar spaced transmitter loops 501 and 503 of FIG. 18, or other suitable field generating means such as a single transmitter loop in the plane of loops 501 and 503 but with its axis coincident with line a—a', are maintained with their axes normal to the surface of the formation 510 under investigation. Transmitter loops 501 and 503 are coupled to a source 505 or oscillatory current so as to generate respectively opposed primary magnetic fields, represented by an exemplary field line $B_p$. The composite primary magnetic field induces eddy currents in formation 510 that are greatest in the place defined by the locus equidistant from the axes of the transmitter loops 501 and 503 and represented in FIG. 17 by line a—a'. Coplanar receiver loops 507 and 509, mounted in mirror image about the plane represented by line a—a' and preferably mounted coaxially with transmitter loops 501 and 503 as shown, intercept the lines of flux of a secondary magnetic field arising from the induced eddy currents. Receiver loops 507 and 509, which are connected in series opposition to a receiver 511, are electromagnetically symmetrical. The reseponses of the receiver loops 507 and 509 to both the primary and secondary magnetic fields cancel in a homogeneous isotropic formation; in the vicinity of a shoulder, for example, only their responses to the primary magnetic field cancel. A variation of the sensor of FIG. 18 is shown in FIG. 19, where the transmitting antenna loop 510 and the receiver antenna loops 512 and 514 lie in a common plane. Of course, the photolithography and assembly techniques discussed above are advantageous for the sensors of FIGS. 18 and 19 as well. Accordingly, variation in these and other features are contemplated and are within the scope of the present invention. Moreover, it will be appreciated that sensors equivalent to those described herein may be obtained by interchanging the functions of the transmitter antennae and the receiver antennae. Hence, electromagnetic symmetry of transmitter antennae as well as of receiver antennae is contemplated. It will be understood that although the preferred orientation of the axes of the electromagnetically symmetrical antennae to the other antenna or antennae of each of the several embodiments is described herein as normal or parallel, as the case may be, electromagnetic symmetry can be achieved in these embodiments in accordance with the spirit of the present invention with intermediate orientations as well.

What is claimed is:

1. An apparatus for investigating a characteristic of earth formations traversed by a borehole, comprising:
   a body having a borehole wall-engaging face;
   means for applying said body to the borehole wall with said exterior face against the borehole wall;
   an antenna set for coupling electromagnetic energy with a formation engaged by said wall-engaging face, and mounted in said body, comprising:
   a first antenna element for coupling electromagnetic energy;
   a second antenna element having a first location selected with respect to said first antenna element, for coupling electromagnetic energy; and
   a third antenna element having a second location selected with respect to said first antenna element, for coupling electromagnetic energy; wherein said first and second locations are selected to place said second and third antenna elements in electromagnetic symmetry relative to said first antenna element and parallel thereto; and
   means for differentially coupling said second and third antenna elements.

2. An apparatus as in claim 1, further comprising:
   means for energizing a selected one of said first antenna element and said differentially-coupled second and third antenna elements within a frequency range of 1 MHz and 300 MHz; and
   receiver means coupled to the other one of said first antenna element and said differentially-coupled second and third antenna elements.

3. An apparatus as in claim 1, wherein: said first antenna element comprises a conductive member conformably mounted on a stable form member;
   said second antenna element comprises a conductive member conformably mounted on a stable form member, and
   said third antenna element comprises a conductive member conformably mounted on a stable form member;
   said first, second and third antenna elements being essentially scale-invariant relative to one another.

4. An apparatus as in claim 3, wherein:
   said first, second and third antenna elements are essentially coplanar; and
   the axis of the conductive members of said first, second, and third antenna elements are coaxial and normal to the wall-engaging face of said body.

5. An apparatus as in claim 4, wherein:
   said form comprises a ceramic disk section coaxially integrated with a ceramic cylindrical section;
   the conductive member of said first antenna element comprises a first loop having a preselected diameter, and being conformably mounted on said disk section coaxially therewith;
   the conductive member of said second antenna element comprises a second loop having a preselected diameter different than the diameter of said first loop, and being conformably mounted on said disk section coaxially therewith; and
   the conductive member of said third antenna element comprises a coil having a diameter and number of turns selected to place said second and third antenna elements in electromagnetic symmetry, and being conformably mounted on said cylindrical section.

6. An apparatus as in claim 3, wherein:
   said first, second, and third antenna elements are essentially coplanar; and
   the axis of the conductive members of said first, second, and third antenna elements are coaxial and parallel to the wall-engaging face of said body.

7. An apparatus as in claim 6, wherein:
   said form comprises a ceramic disk section coaxially integrated with a ceramic cylindrical section;
   the conductive member of said first antenna element comprises a first loop having a preselected diameter, and being conformably mounted on said disk section coaxially therewith;
   the conductive member of said second antenna element comprises a second loop having a preselected diameter different than the diameter of said first loop, and being conformably mounted on said disk section coaxially therewith, and
   the conductive member of said third antenna element comprises a coil having a diameter and number of turns selected to place said second and third antenna elements in electromagnetic symmetry, and being conformably mounted on said cylindrical section.

8. An apparatus for investigating a characteristic of earth formations traversed by a borehole, comprising:
   a body having a borehole wall-engaging face;
   means for applying said body to the borehole wall with said exterior surface facing the borehole wall;
   an antenna set mounted in said body for coupling electromagnetic energy with a formation engaged by said wall-engaging face, including a first antenna element, a second antenna element, and a third antenna element; said second and third antenna elements being positioned to be in electromagnetic symmetry relative to said first antenna element and parallel thereto;
   means for differentially coupling said second and third antenna elements;
   means for energizing a selected one of said first antenna element and said differentially-coupled second and third antenna elements within a frequency range of 1 MHz and 300 MHz to couple electromagnetic energy into a formation; and
   receiver means coupled to the other one of said first antenna elements.

9. An apparatus as in claim 8, wherein:
   said first antenna element comprises a conductive member conformably mounted on a stable form member;
   said second antenna element comprises a conductive member conformably mounted on a stable form member, and said third antenna element comprises a conductive member conformably mounted on a stable form member;

said first, second and third antenna elements being essentially scale-invarient relative to one another.

10. An apparatus as in claim 9, wherein:

said first, second, and third antenna elements are essentialy coplanar; and the axis of the conductive members of said first, second, and third antenna elements are coaxial and normal to the wall-engaging face of said body.

11. An apparatus as in claim 10, wherein:

said form comprises a ceramic disk section coaxially integrated with a ceramic cylindrical section;

the conductive member of said first antenna element comprises a first loop having a preselected diameter, and being conformably mounted on said disk section coaxially therewith;

the conductive member of said second antenna element comprises a second loop having a preselected diameter different than the diameter of said first loop, and being conformably mounted on said disk section coaxially therewith; and the conductive member of said third antenna element comprises a coil having a diameter and number of turns selected to place said second and third antenna elements in electromagnetic symmetry, and being conformably mounted on said cylindrical section.

12. An apparatus as in claim 9, wherein:

said first, second, and third antenna elements are essentially coplanar; and the axis of the conductive members of said first, second, and third antenna elements are coaxial and parallel to the wall-engaging face of said body.

13. An apparatus as in claim 12, wherein:

said form comprises a ceramic disk section coaxially integrated with a ceramic cylindrical section;

the conductive member of said first antenna element comprises a first loop having a preselected diameter, and being conformably mounted on said disk section coaxially therewith;

the conductive member of said second antenna element comprises a second loop having a preselected diameter different than the diameter of said first loop, and being conformably mounted on said disk section coaxially therwith; and the conductive member of said third antenna element comprises a coil having a diameter and number of turns selected to place said second and third antenna elements in electromagnetic symmetry, and being conformably mounted on said cylindrical section.

14. An apparatus for investigating a characteristic of earth formations traversed by a borehole, comprising:

a longitudinally elongated body having a borehole wall-engaging face;

means for applying said body to the borehole wall with said face contacting the borehole wall;

a transmitter antenna mounted in said body for coupling electromagnetic energy into a formation engaged by said wall-engaging face;

a receiver antenna mounted in said body and having differentially coupled antenna elements located in electromagnetic symmetry relative to said transmitter antenna and parallel thereto;

means for energizing said transmitter antenna in the frequency range of 1 MHz and 300 MHz; and means coupled to said receiver antenna for obtaining an indication of said characteristic.

15. An apparatus as in claim 14, wherein:

said transmitter and recieving antennae are fabricated on an integrated form member comprising an inner ceramic cylindrical section and an outer ceramic disk section, said sections being essentially coplanar;

said transmitter antenna comprises a first conductive loop having a preselected diameter, and being conformably mounted on said disk section coaxially therewith; and said receiver antenna comprises:

a second conductive loop having a preselected diameter different than the diameter of said first loop, and being conformably mounted on said disk section coaxially therewith; and a conductive coil having a diameter and number of turns selected to place said second and third antenna elements in electromagnetic symmetry relative to said transmitter antenna, and being conformably mounted on said cylindrical section coaxially therewith.

16. A wall-engaging apparatus as in claim 15, wherein the orientation of the axis of said transmitter loop is selected normal to the wall-engaging face of said body.

17. A wall-engaging apparatus as in claim 15, wherein the orientation of the axis of said transmitter loop is selected parallel to the wall-engaging face of said body.

18. An apparatus for investigating a characteristic of earth formations traversed by a borehole, comprising:

a longitudinally elongated body having a borehole wall-engaging face;

means for applying said body to the borehole wall with said face contacting the borehole wall;

a receiver antenna mounted in said body;

a transmitter antenna mounted in said body and having differentially coupled antenna elements located in electromagnetic symmetry relative to said receiver antenna and parallel thereto, for coupling electromagnetic energy into a formation engaged by said wall-engaging face;

means for energizing said transmitter antenna in the frequency range of 1 MHz an 300 MHz; and means coupled to said receiver antenna for obtaining an indication of said characteristic.

19. An apparatus as in claim 18, wherein:

said transmitter and recieving antennae are fabricated on an integrated form member comprising an inner ceramic cylindrical section and an outer ceramic disk section, said sections being essentially coplanar;

said receiver antenna comprises a first conductive loop having a preselected diameter, and being conformably mounted on said disk section coaxially therewith; and said transmitter antenna comprises:

a second conductive loop having a preselected diameter different than the diameter of said first loop, and being conformably mounted on said disk section coaxially therewith; and a conductive oil having a diameter and number of turns selected to place said second and third antenna elements in electromagnetic symmetry relative to said receiver antenna, and being conformably mounted on said cylindrical section coaxially therewith.

20. A wall-engaging apparatus as in claim 19, wherein the orientation of the axis of said receiver loop is selected normal to the wall-engaging face of said body.

21. A wall-engaging apparatus as in claim 19, wherein the orientation of the axis of said receiver loop is selected parallel to the wall-engaging face of said body.

* * * * *